United States Patent [19]

Platt et al.

[11] 4,413,646

[45] Nov. 8, 1983

[54] STREAMLINE COAL SLURRY LETDOWN VALVE

[75] Inventors: Robert J. Platt, Dover; Edward A. Shadbolt, Basking Ridge, both of N.J.

[73] Assignee: Exxon Research and Engineering Co., Florham Park, N.J.

[21] Appl. No.: 263,750

[22] Filed: May 14, 1981

Related U.S. Application Data

[63] Continuation-in-part of Ser. No. 259,489, May 1, 1981.

[51] Int. Cl.³ .................. F16K 1/12; F16K 47/04
[52] U.S. Cl. .................. 137/240; 251/122; 251/362; 251/124; 137/625.37; 137/375
[58] Field of Search ............ 251/122, 362, 368, 124; 137/625.37, 625.3, 625.33, 240, 613, 375

[56] References Cited

U.S. PATENT DOCUMENTS

| | | | |
|---|---|---|---|
| 2,227,542 | 1/1941 | Grove | 251/362 |
| 2,915,087 | 12/1959 | Kruschik | 137/625.37 |
| 3,767,164 | 10/1973 | Robinson | 251/368 X |
| 3,918,471 | 11/1975 | Bedner | 137/238 |
| 4,047,695 | 9/1977 | Cleveland et al. | 251/122 |

FOREIGN PATENT DOCUMENTS 1288028  9/1972  U.S.S.R. ................. 251/122

OTHER PUBLICATIONS

"Easy-e Industrial Control Valves"-Fisher Controls Brochure Catalog No. E-195, Bulletin 51.1:010, Jul. 1972.

Primary Examiner—Arnold Rosenthal
Attorney, Agent, or Firm—Robert S. Salzman; Donald F. Wohlers

[57] ABSTRACT

A streamlined coal slurry letdown valve is featured which has a two-piece throat comprised of a seat and seat retainer. The two-piece design allows for easy assembly and disassembly of the valve. A novel cage holds the two-piece throat together during the high pressure letdown. The coal slurry letdown valve has long operating life as a result of its streamlined and erosion-resistance surfaces.

9 Claims, 5 Drawing Figures

STREAMLINE COAL SLURRY LETDOWN VALVE

The Government of the United States of America has rights in this invention pursuant to cooperative agreement No. DE-FC01-77ET10069 (formerly agreement No. EF-77-A-01-2893) awarded by the U.S. Energy Research and Development Administration, now the U.S. Department of Energy.

RELATED APPLICATIONS

This application is a continuation-in-part of Ser. No. 259,489 filed in the United States Patent and Trademark Office on or about May 1, 1981.

FIELD OF THE INVENTION

This invention relates to a valve used in synthetic fuels processing, and more particularly, to a coal slurry letdown valve of novel streamlined design.

BACKGROUND OF THE INVENTION

Synthetic fuels processing is a relatively new art. As such, many new and unusual problems have arisen, one of which is the design and fabrication of high performance letdown valves. These letdown valves are used to reduce high pressure reactor effluent slurry to low pressure.

The donor solvent coal liquefaction process, in which these valves are used, produces low sulfur liquid products from bituminous, subbituminous, and other types of coal.

A coal preparation section receives feed coal and crushes it to the desired coal particle size for the liquefaction reaction. A slurry drying section mixes the crushed coal with a hydrogenated recycle solvent stream to form the slurry feed to a liquefaction section. Mixing takes place at approximately 250° F. and moisture that enters with the feed coal is vaporized.

In the liquefaction section, the crushed and dried coal is liquefied in a non-catalytic tubular reaction in the presence of molecular $H_2$ and the hydrogen donor solvent which was added to the slurry dryer. Reactor operating conditions are approximately 840° F. and 1920 psig.

Effluent from the liquefaction reactor is separated by distillation in a produce recovery section into gas, naphtha, distillates, and a vacuum bottoms slurry. A portion of the distillates serve as feed to a solvent hydrogenation section. In the solvent hydrogenation section, the solvent is catalytically hydrogenated before being recycled for slurrying with the feed coal. The hydrogen donor solvent is a nominal 400/700° F. boiling range material fractionated from the middle boiling range of the hydrogenated liquid product.

The liquefaction reaction section is comprised of a preheat furnace that heats a mixture of feed from the slurry drier and treat gas, the reactors and a separator vessel. A mixture of coal and solvent is pumped to a high pressure level required for the reactors. Hydrogen rich treat gas is mixed with the feed and both pass through the preheat furnace before entering the reactors. Reactor product then enters the separator drum where lighter material is removed in vapor form overhead and heavier liquids exit via drum bottoms. Heavy intermediate product is sent to fractionation facilities for separation into distillates.

The high pressure slurry letdown valve, which is the subject of this invention, controls the level of the liquid within the separator drum.

The throat of this letdown valve is subject to extremely erosive conditions resulting from the three phase flow of coal slurry solids, liquids and gases at extremely high temperatures and pressures. The highly erosive medium can destroy a conventional valve in a matter of hours. The present invention features a new valve design which can withstand the extreme conditions to which it is subjected. The valve of this invention is comprised of an inner valve passageway which has been scientifically engineered to reduce wear to a minimum, and which is easily constructed and maintained.

SUMMARY OF THE INVENTION

The invention pertains to a high pressure coal slurry letdown valve comprising a high pressure valve inlet and a low pressure valve outlet. A coal slurry flow path is disposed between the inlet and outlet of the valve. A biased cage is fixedly disposed within this flow path opposite the inlet. A valve throat is disposed adjacent the biased cage and is defined by a two-piece seat and seat retainer. The seat and seat retainer is held in contacting adjacency with each other by the biased cage during high pressure letdown. A movable plug is disposed within the biased cage for controlling the flow of the coal slurry through the valve throat.

The valve throat is made of two mating pieces, i.e. a seat and seat retainer, in order to easily assemble and disassemble the valve throat. The valve throat experiences the most wear, in the valve passageway, and must be removed when worn.

Normally, the valve throat is made in one-piece, which is thermally force-fitted into the valve body. Removal of this throat is a painstaking inconvenience. The inventive two-piece design eliminates this problem. However, the high pressured flow would cause the seat and seat retainer to vibrate and chatter, if it were not for the biased cage. The cage holds these pieces together.

The passageway of the valve is streamlined to reduce fluid friction and wear. The facings of the cage are designed to conform to the streamlined passageway in order to accommodate the smooth flow of materials through the cage into the throat. The cage comprises a plurality of equally spaced pillars, generally four in number. One of the pillars is disposed directly opposite the inlet to reduce fluid friction.

The cage is biased against the valve seat by means of a number of belville springs. The cage may also be bolted in place, if so desired.

The pressure drop across the valve throat is from approximately 2,000 psi to approximately under 100 psi. The plug comprises erosion resistant material such as tungsten carbide in the lip portion, but comprises stainless steel thereafter for purposes of strength.

It is an object of this invention to provide an improved coal slurry letdown valve;

It is another object of the invention to provide a coal slurry letdown valve that is streamlined, wear resistant, and which is easily assembled and disassembled.

These and other objects of this invention will become more apparent and will be better understood with reference to the following detailed description considered in conjunction with the accompanying drawings.

DETAILED DESCRIPTION OF THE INVENTION

Generally speaking, the invention is for a coal slurry letdown valve used in synthetic fuels processing. The coal slurry comprises coal particles dispersed in a hydrocarbon mixture. The coal slurry enters the letdown valve at approximately 2,000 psi and passes through the throat of the valve where it drops to approximately 80 psi.

Figure 1:
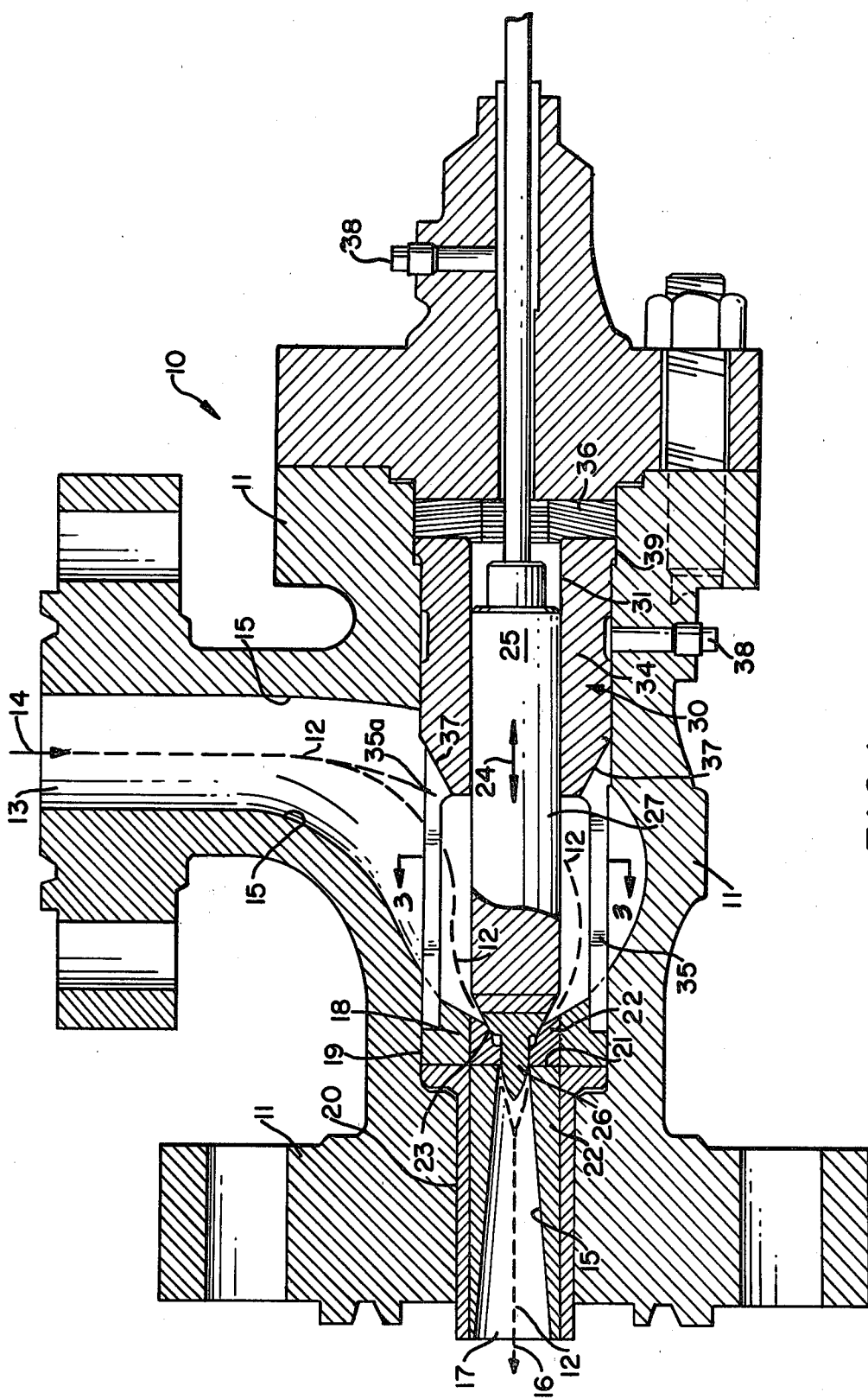
FIG. 1 is a cross-sectional view of the internal structure of the coal slurry letdown valve of this invention.
Figure 2:
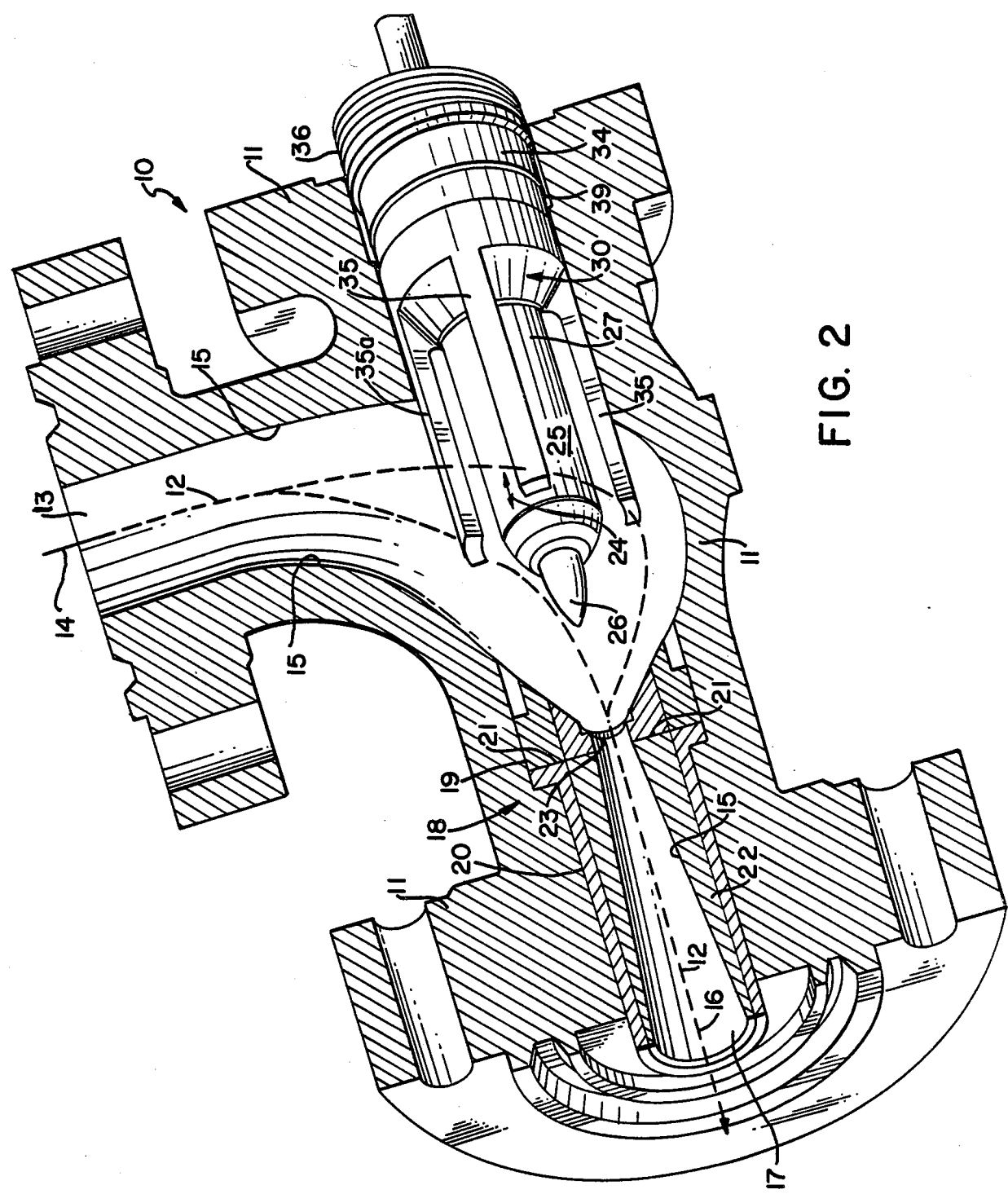
FIG. 2 is a perspective cutaway view of the inventive valve of FIG. 1.

Referring to FIGS. 1 and 2, the coal slurry letdown valve 10 of this invention is shown. The valve 10 comprises a body portion 11 which has an internal flow path 12 defined by an internal wall 15. The coal slurry flows into inlet 13 as depicted by arrow 14, along the flow path 12, and exits at outlet 17 as illustrated by arrow 16.

A valve throat 18 is disposed in the middle of the valve 10 and forms part of the flow path 12. The valve throat is comprised of two structural elements, a valve seat 19 and a valve seat retainer 20, as shown. The valve seat 19 is connected to the valve seat retainer 20 along their common adjacent surface 21. The valve seat 19 and valve seat retainer 20 are respectively lined with erosion-resistant material 22, such as tungsten carbide.

A plug 25 is movably disposed (arrows 24) within the valve 10. The plug 25 is shown seated flush against the neck 23 of throat 18 in FIG. 1, and is shown in a withdrawn position from neck 23, as depicted in FIG. 2. The plug 25 controls the flow of the coal slurry across neck 23 of throat 18, and hence, controls the flow through the valve.

The plug 25 has an erosion-resistant nose 26, which seats against the erosion-resistant surface of neck 23. The body 27 of the plug 25 is comprised of stainless steel for purposes of providing structural strength and rigidity to the plug 25.

Figure 3:
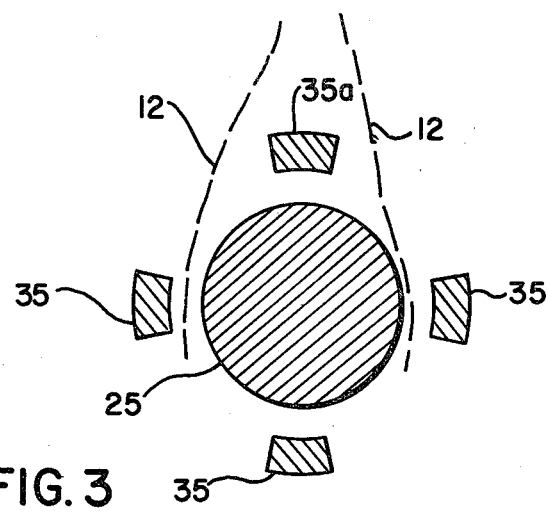
FIG. 3 is a sectional view taken along lines 3—3 of the plug and cage structure shown in FIG. 1.
Figure 4:
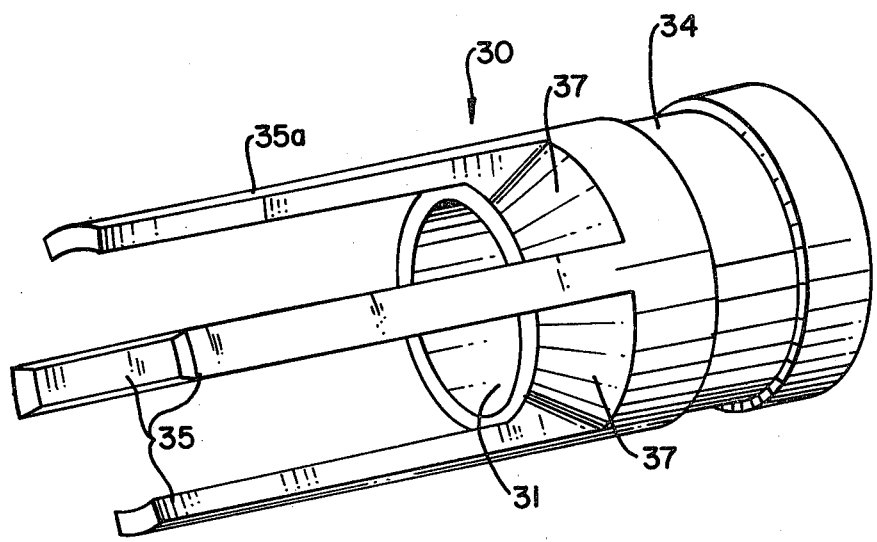
FIG. 4 is a perspective view of the cage structure illustrated in FIGS. 1-3.

A cage 30, shown in more detail in FIGS. 3 and 4, surrounds the plug 25 and provides an internal bore 31 through which the plug can be advanced or withdrawn (arrows 24) from neck 23. The cage 30 comprises a cylindrical body section 34 from which a plurality of arms or pillars 35 extend. The pillars 35 abut against the valve seat 19, and maintain the valve seat 19 in contact with adjacent retainer 20 during high pressure letdown.

The cage 30 is biased toward valve seat 19 by a number of belville springs 36. The cage 30 can also be bolted in place (not shown), if so desired.

The internal surfaces 15 of the valve are designed to have a streamlined shape, so as to provide a smooth flow for the coal slurry. The cage surfaces 37 are designed to conform to the sloping surfaces 15, so as to continue a smooth material flow about the cage 30 into the throat 18.

Figure 5:
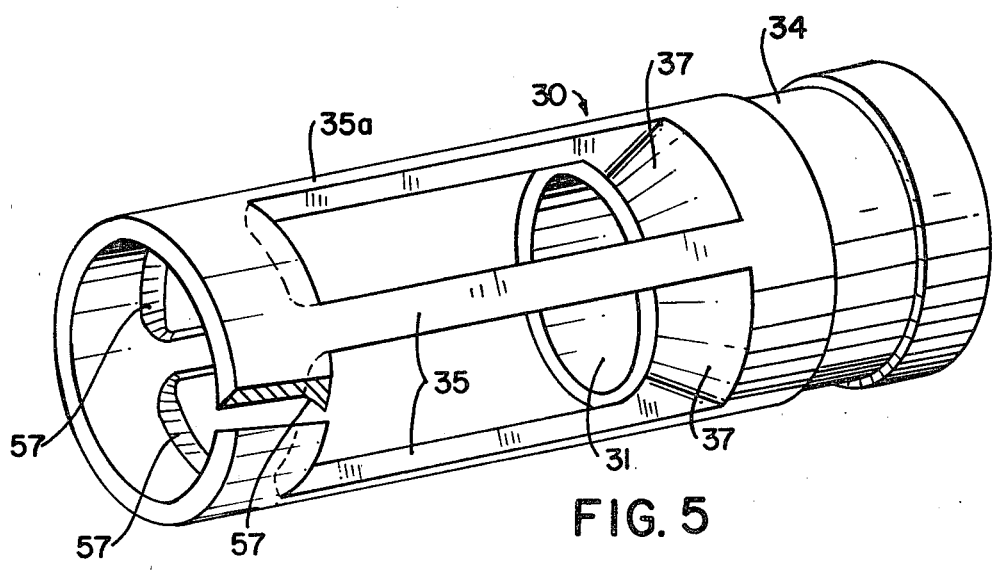
FIG. 5 is a cutaway view of an alternate embodiment of the cage structure shown in FIG. 4.

FIG. 5 illustrates an alternate design for the cage shown in FIG. 4. The cage 30 of FIG. 5 has an additional surface 57 at its front end which conforms with the streamlined passageway 15. This allows a smooth flow of slurry materials into the throat.

The valve 10 has two purge connections 38, wherein fluid may be introduced to the bores 31 and 39, respectively, to prevent particulate from working into the plug and cage mechanism.

The internal wall 15 of the valve 10 can be made from K-701 Kenne-metal to provide a smooth hard surface.

The cage 30 is arranged such that the top pillar 35a is directly opposite the inlet 13. This provides a streamlined flow from the inlet, through the cage, into the throat 18.

The combination of wear resistant and streamlined surfaces are a first for this type of valve, and provide for long operating life.

As aforementioned, the throat 18 comprising the valve seat 19 and valve seat retainer 20, is usually made as one-piece which is hard to assemble and disassemble from the valve body 11. However, the present two-piece design allows for easy removal of the throat 18 when it becomes worn.

Having thus described this invention, what is desired to be protected by Letters Patent is presented by the following appended claims.

What is claimed is:

1. A high pressure coal slurry letdown valve, comprising:

means defining a high pressure cylindrical flange valve inlet and a low pressure cylindrical flange valve outlet, said outlet including a stepped cylindrical bore including an internal recess for slidably receiving and locating a valve seat means and wherein the central axis of said inlet and said outlet are disposed at generally right angles to one another;

means defining a streamlined arcuate coal slurry flow path disposed between said inlet and said outlet;

two-piece valve seat means defining a valve throat, said seat means including a first member having a downstream divergent flow path and adapted to slidably seat within said bore against said internal recess and having a flat upstream end surface transverse to said flow path, and a second member separate from said first member slidably fitted in said bore in abutting end contact with the flat end portion of said first member defining a convergent upstream portion of said seat means;

a biased cage including at least two pillars fixedly disposed within said flow path opposite said inlet, said cage having at least two truncated conical surface portions between said pillars adjacent said valve inlet to provide streamlined surfaces generally conforming to the streamlined arcuate flow path means between said inlet and said outlet, said cage having an end portion in contact with said seat means second member to hold said seat means in said recess; and a plug movably disposed within and slidably supported by said biased cage for controlling flow of coal slurry through said valve throat.

2. The high pressure coal slurry letdown valve of claim 1, comprising at least one purge connection in fluid communication with said plug.

3. The high pressure coal slurry letdown valve of claim 1, wherein said cage is biased by a plurality of belville springs.

4. The high pressure coal slurry letdown valve of claim 3, wherein said cage includes four substantially equally spaced pillars.

5. The high pressure coal slurry letdown valve of claim 4, wherein at least one pillar of said cage is disposed directly opposite said inlet.

6. The high pressure coal slurry letdown valve of claim 1, wherein an external surface of said valve throat is lined with erosion resistant material such as tungsten carbide.

7. The high pressure coal slurry letdown valve of claim 1, wherein said plug comprises an erosion resistant material only in a tip portion thereof, a remaining portion of said plug comprising stainless steel.

8. The high pressure coal slurry letdown valve of claim 1, wherein said cage comprises two spaced-part annular ring members joined by said pillars.

9. The high pressure coal slurry letdown valve of claim 8, wherein said annular ring member adjacent said valve seat means includes conical recesses defining additional streamlined surfaces conforming with said streamlined flow path means and said convergent upstream portion of said seat means.

* * * * *